United States Patent
Sonobe

(10) Patent No.: US 11,606,404 B2
(45) Date of Patent: Mar. 14, 2023

(54) RELAY DEVICE AND RELAY METHOD OF VOICE SIGNAL

(71) Applicant: ICOM INCORPORATED, Osaka (JP)

(72) Inventor: Hirotaka Sonobe, Osaka (JP)

(73) Assignee: ICOM INCORPORATED, Osaka (JP)

( * ) Notice: Subject to any disclaimer, the term of this patent is extended or adjusted under 35 U.S.C. 154(b) by 106 days.

(21) Appl. No.: 17/273,054

(22) PCT Filed: Apr. 26, 2019

(86) PCT No.: PCT/JP2019/017871
§ 371 (c)(1),
(2) Date: Mar. 3, 2021

(87) PCT Pub. No.: WO2020/066106
PCT Pub. Date: Apr. 2, 2020

(65) Prior Publication Data
US 2021/0329056 A1    Oct. 21, 2021

(30) Foreign Application Priority Data

Sep. 27, 2018   (JP) .............................. JP2018-181220

(51) Int. Cl.
*H04L 65/65* (2022.01)
*H04L 65/75* (2022.01)
(Continued)

(52) U.S. Cl.
CPC .......... *H04L 65/65* (2022.05); *H04L 65/1045* (2022.05); *H04L 65/1104* (2022.05); *H04L 65/75* (2022.05)

(58) Field of Classification Search
CPC . H04L 65/65; H04L 65/1045; H04L 65/1104; H04L 65/75; H04L 65/1053;
(Continued)

(56) References Cited

U.S. PATENT DOCUMENTS 8,149,743 B1 *   4/2012   Choksi .................. H04L 5/14
                                                      370/296
2003/0224825 A1   12/2003  Cox
(Continued)

FOREIGN PATENT DOCUMENTS

CN    1638390 A    7/2005
CN    1656785 A    8/2005
(Continued)

OTHER PUBLICATIONS

Office action of the corresponding CN application No. 201980059197.7 dated Mar. 2, 2022 and English translation thereof.
(Continued)

*Primary Examiner* — Khaled M Kassim
*Assistant Examiner* — Najeeb Ansari
(74) *Attorney, Agent, or Firm* — Muncy, Geissler, Olds & Lowe, P.C.

(57) ABSTRACT

[Problem] When a communication apparatus that is the communication partner is called via a relay device, the transmission control mode of a voice signal can be switched according to the capability of the communication partner.
[Solution] A relay device (2) includes a telephone relay unit (3), a network communication relay unit (4), and a wireless communication relay unit (5). The wireless communication relay unit (5) includes a plurality of external apparatus interfaces, and an analog repeater (25), a digital repeater (27), or the like is connected to each external apparatus interface. If an SIP telephone (20) has called an analog transceiver (27), the relay device (2) obtains the address and apparatus type of the analog transceiver (27) from call information, and transmits a voice signal to the analog transceiver (27) using a transmission control mode (VOX mode) that suits the analog transceiver (27).

13 Claims, 7 Drawing Sheets

(51) Int. Cl.
  *H04L 65/1045* (2022.01)
  *H04L 65/1104* (2022.01)
(58) Field of Classification Search
  CPC .. H04L 65/4061; H04W 4/18; H04W 84/047; H04W 4/16; H04W 88/181; H04M 3/56
  See application file for complete search history.

(56) References Cited

U.S. PATENT DOCUMENTS

| | | |
|---|---|---|
| 2005/0143063 A1 | 6/2005 | Mizutani |
| 2006/0013195 A1 | 1/2006 | Son |
| 2010/0246583 A1* | 9/2010 | Morinaga ........... H04L 41/0677 370/392 |
| 2014/0119274 A1 | 5/2014 | Uwamori |
| 2014/0177516 A1 | 6/2014 | Sonobe |
| 2014/0179327 A1 | 6/2014 | Uwamori |
| 2015/0009865 A1* | 1/2015 | Sharma ................. H04W 4/10 370/277 |
| 2015/0333817 A1 | 11/2015 | Uwamori |
| 2016/0249274 A1 | 8/2016 | Sonobe |
| 2016/0269077 A1 | 9/2016 | Sonobe |
| 2017/0163332 A1 | 6/2017 | Sonobe |
| 2018/0176266 A1 | 6/2018 | Homer |
| 2019/0074892 A1 | 3/2019 | Sonobe |

FOREIGN PATENT DOCUMENTS

| | | |
|---|---|---|
| EP | 2750300 A2 | 7/2014 |
| JP | 2011-135291 A | 7/2011 |
| JP | 2014-087027 A | 5/2014 |
| JP | 2014-127875 A | 7/2014 |
| WO | 2015/068663 A1 | 5/2015 |
| WO | 2016/002866 A1 | 1/2016 |

OTHER PUBLICATIONS

Office action of the corresponding EP application No. 19864264.7 dated Apr. 14, 2022.

* cited by examiner

CALL DESTINATION TABLE

| ID | CALL TYPE | COMMUNICATION APPARATUS TYPE | ADDRESS INFORMATION (IP ADDRESS, PORT NO.) | BELONGING RADIO |
|---|---|---|---|---|
| 201 | INDIVIDUAL | ANALOG | (127.0.0.1, 30000) | |
| 202 | INDIVIDUAL | DIGITAL | (127.0.0.1, 30002) | |
| 301 | INDIVIDUAL | WLAN | (192.168.0.10, 10000) | |
| 401 | INDIVIDUAL | LTE | (192.168.0.11, 11000) | |
| 1001 | GROUP | | | 201, 202 |
| 1000 | PLENARY | | | |

Fig. 3A

PTT CONTROL TABLE

| TYPE | CONTROL MODE |
|---|---|
| PLENARY/GROUP | DTMF |
| WLAN TRANSCEIVER | VOX |
| LTE TRANSCEIVER | CONSTANT TRANSMISSION |
| RADIO | VOX |
| MICROPHONE/SPEAKER | CONSTANT TRANSMISSION |

Fig. 3B

RELAY DEVICE AND RELAY METHOD OF VOICE SIGNAL

TECHNICAL FIELD

The present invention relates to a relay device that relays communication between a telephone and a radio, and specifically relates to optimization of transfer control of a voice signal.

BACKGROUND ART

Relay devices that relay voice communication made by a radio transceiver, a telephone, or the like over a network have been proposed (refer to Patent Literatures 1, 2, and 3). As a result of connecting a plurality of relay devices to a network, different types of communication apparatuses such as an IP telephone and a radio can perform voice communication to each other.

CITATION LIST

Patent Literature 1: JP 2014-087027A
Patent Literature 2: WO 2015/068663
Patent Literature 3: WO 2016/002866

Problems to be Solved by Invention

When two relay devices that are connected to each other via a network relay voice communication between different types of communication apparatuses, as described above, a communication apparatus on the transmitting side cannot recognize the capability of a communication apparatus on the receiving side. Therefore the communication apparatus on the transmitting side cannot perform transmission control of a voice signal in accordance with the capability of the communication apparatus on the receiving side, and merely transmits the voice signal using a predetermined fixed mode. For example, when a telephone that performs full duplex communication calls a radio and performs communication, if it is possible to recognize the communication capability (full duplex/half duplex) of the radio to be called, the telephone can determine which of a constant transmission mode and a VOX mode is to be adopted for transmitting the voice signal, according to the capability. If this is not the case, there is a problem in that transmission must be uniformly performed using the VOX mode, or the like.

Therefore, the present invention aims to make it possible to switch, when a communication apparatus that is the communication partner is called via a relay device, the transmission control mode of a voice signal according to the capability of the communication partner.

SUMMARY OF INVENTION

A relay device of the present invention includes a telephone relay unit and a wireless communication relay unit. The telephone relay unit receives call information from a telephone via a network, and after a communication partner designated by the call information has responded, transmits/receives a voice signal to/from the telephone. The wireless communication relay unit, to which a repeater that is a relaying radio is connected, transmits/receives a voice signal to/from a radio via the repeater. The telephone relay unit determines a destination apparatus that is a radio to be called based on the call information received from the telephone, and transfers a voice signal received from the telephone to the wireless communication relay unit. The wireless communication relay unit transfers a voice signal transferred from the telephone relay unit to the destination apparatus. The telephone relay unit determines a transfer control mode of the voice signal corresponding to the determined destination apparatus, and transfers the voice signal to the wireless communication relay unit using the determined mode.

A relay method of a voice signal of the present invention includes, in a relay device to which a telephone and a repeater that is a relaying radio that communicates with a radio are connected: receiving call information for calling a radio from the telephone; determining a destination apparatus that is a radio to be called based on the call information; determining a transfer control mode of a voice signal corresponding to the determined destination apparatus; calling the destination apparatus via the repeater; and transferring, after the destination apparatus has responded, a voice signal received from the telephone to the repeater using the determined transfer control mode.

In the invention described above, the transfer control mode of a voice signal may be one of a constant transmission mode in which voice signals are transferred without interruption in a period in which the telephone and the destination apparatus perform communication, a VOX mode in which only when a voice signal whose level is a predetermined level or more is input from the telephone, the voice signal is transferred, and a Dual-Tone Multi-Frequency (DTMF) mode in which voice signals are transferred without interruption in a period after a tone signal instructing a transmission start was input until a tone signal instructing a transmission stop is input.

In the invention described above, the telephone relay unit may be provided with a call destination table and a transfer control table. The call destination table is a table in which a record including the call information, an address of the destination apparatus, and an apparatus type of the destination apparatus is stored for each of the radios. The transfer control table is a table in which a record including the apparatus type and the transfer control mode of a voice signal is stored for each of the apparatus types. The telephone relay unit determines the apparatus type of the destination apparatus by referring to the call destination table, determines the transfer control mode of a voice signal corresponding to the determined apparatus type by referring to the transfer control table, and transfers a voice signal using the determined transfer control mode.

In the invention described above, the transfer control table may store a transfer control mode of a voice signal in accordance with a function of transmitting and receiving a voice signal that the destination apparatus has, in association with the apparatus type.

In the invention described above, the relay device may include a network communication relay unit. The network communication relay unit is to be connected to a WLAN transceiver via a network, and is to be connected to an LTE transceiver via an LTE network. The WLAN transceiver and the LTE transceiver start transmitting voice signals to communication partners without performing a prior call procedure via the network and the LTE network, respectively. The call destination table and the transfer control table store records of the WLAN transceiver and the LTE transceiver. Also, the call destination table may further store a record of group communication in which a plurality of communication apparatuses are destination apparatuses.

Advantageous Effects of Invention

According to this invention, when voice signals are transmitted and received between different types of communication apparatuses, transmission control of voice signals that matches the function of a communication apparatus on the receiving side is made possible.

BRIEF DESCRIPTION OF DRAWINGS

FIG. 3A is a diagram illustrating a call destination table provided in the relay device.

FIG. 3B is a diagram illustrating a PTT control table provided in the relay device.

DETAILED DESCRIPTION OF THE EMBODIMENT

Figure 1:
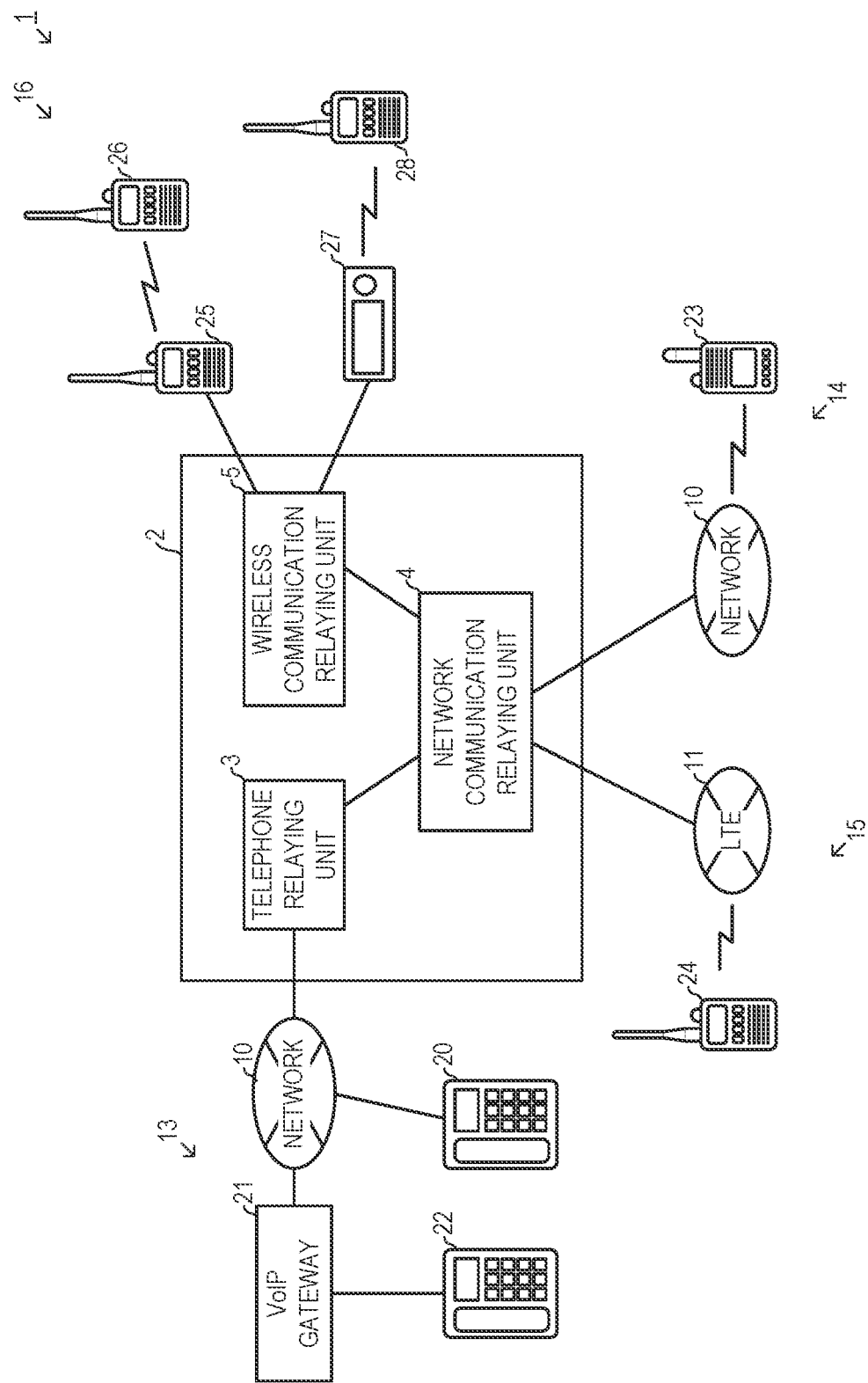
FIG. 1 is a block diagram of a voice communication system.
Figure 2:
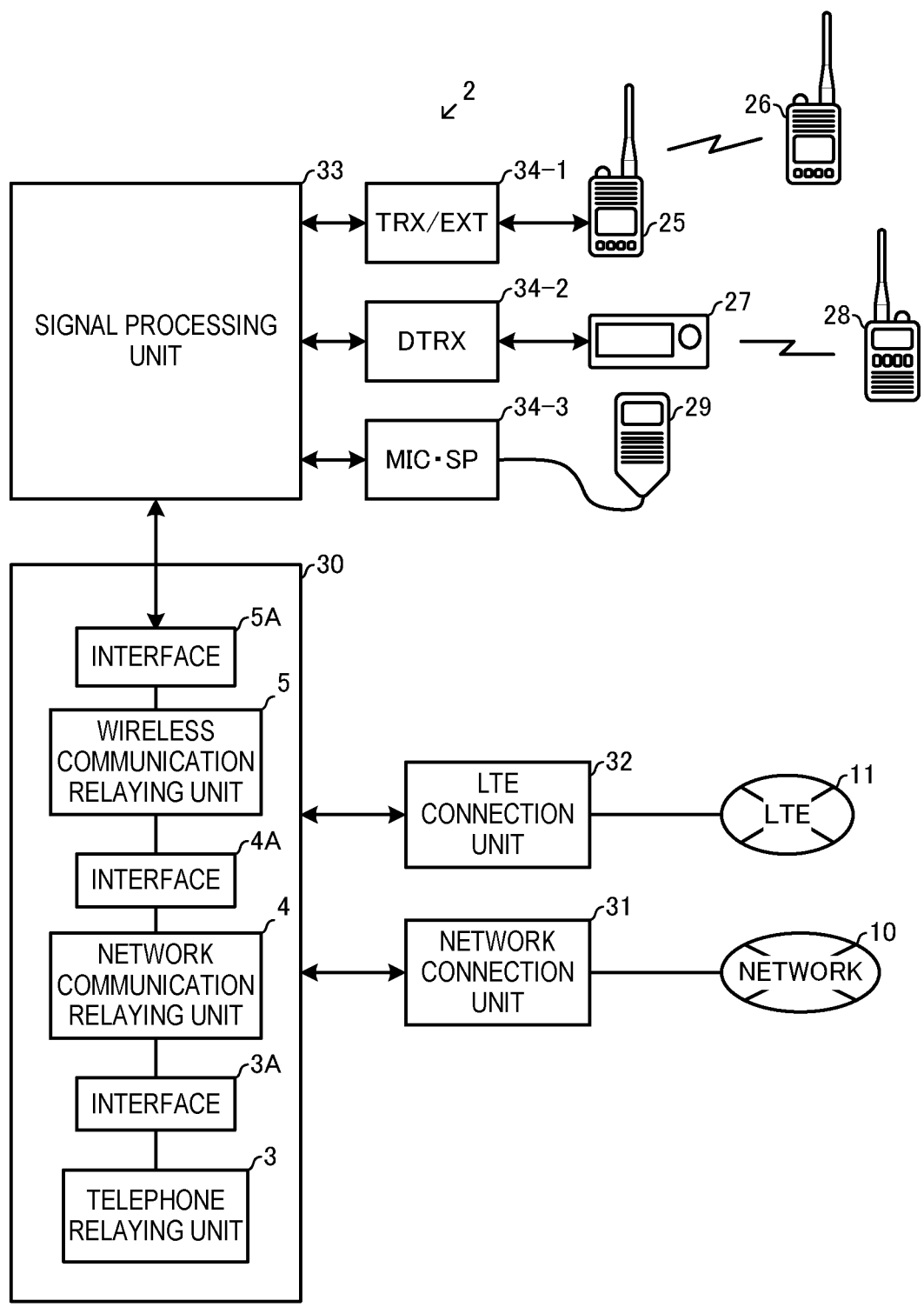
FIG. 2 is a block diagram of a relay device.

A voice communication system of the present invention will be described with reference to the drawings. FIG. 1 is a configuration diagram of a voice communication system 1, which is an embodiment of the present invention. FIG. 2 is a diagram illustrating the configuration of a relay device 2.

The voice communication system 1 includes the relay device 2. The relay device 2 relays voice communication between a plurality of communication systems constituted by an IP telephone system 13, a WLAN (wireless LAN) transceiver system 14, an LTE (Long Term Evolution) transceiver system 15, and a wireless communication system 16. Therefore, the relay device 2 includes a telephone relay unit 3, a network communication relay unit 4, and a wireless communication relay unit 5.

The IP telephone system 13 is connected to the telephone relay unit 3. The IP telephone system 13 includes an SIP phone 20 and a VoIP gateway 21 that are connected to a network 10, and an extension telephone 22 connected to the VoIP gateway 21. The VoIP gateway 21 has a PBX function and is also connected to a telephone line (external line).

A network 10 including a wireless access point (not illustrated) and an LTE communication network 11 including a base station (not illustrated) are connected to the network communication relay unit 4. The WLAN transceiver system 14 is constructed on the network 10, and the LTE transceiver system 15 is constructed on the LTE communication network 11. The WLAN transceiver system 14 includes a WLAN transceiver 23 that accesses the network 10 via the wireless access point. The LTE transceiver system 15 includes an LTE transceiver 24 that accesses the LTE communication network 11 via the base station. The configuration and functions of the network communication relay unit 4 are described in detail in WO 2015/068663, which is a prior patent application of this applicant.

As shown in FIG. 2, a plurality of external apparatus interfaces 34, which are portions of a signal processing unit 33 are connected to the wireless communication relay unit 5. An analog-type radio transceiver (repeater) 25 and a digital-type radio transceiver (repeater) 27 are connected to the external apparatus interfaces 34. The repeater 25 communicates with a handy radio transceiver (analog transceiver) 26 of the same analog type. The repeater 27 communicates with a handy radio transceiver (digital transceiver) 28 of the same digital type. The configuration and functions of the wireless communication relay unit 5 are described in detail in JP 2014-087027A and WO 2016/002866, which are prior patent applications of this applicant.

FIG. 2 is a block diagram of the relay device 2. As shown in FIG. 1, the relay device 2 includes the telephone relay unit 3, the network communication relay unit 4, and the wireless communication relay unit 5. The functions of these units are mainly realized by software. The relay device 2 includes a control unit 30. The control unit 30 is constituted by a computer including a CPU, a ROM, a RAM, and the like. A network connection unit 31, an LTE connection unit 32, and a signal processing unit 33 are connected to the control unit 30. The network connection unit 31 is connected to the networks 10. The LTE connection unit 32 is connected to the LTE communication network 11. Although the networks 10 connected to the telephone relay unit 3 and the network communication relay unit 4 are separately described in FIG. 1, these networks may be the same.

In the relay device 2, the functions of the telephone relay unit 3, the network communication relay unit 4, and the wireless communication relay unit 5 are realized by cooperation between hardware including the control unit 30 and software. The telephone relay unit 3 includes an interface 3A for transmitting and receiving a voice signal and the like to and from the network communication relay unit 4. The network communication relay unit 4 includes an interface 4A for transmitting and receiving a voice signal and the like to and from the wireless communication relay unit 5. The wireless communication relay unit 5 includes an interface 5A for transmitting and receiving a voice signal and the like to and from the signal processing unit 33. The signal processing unit 33 extracts a voice signal from an RTP packet received from the control unit 30 (interface 5A), converts the voice signal to a digital or analog signal wave, and outputs the signal wave to the external apparatus interface 34. The signal processing unit 33 compresses and encodes a digital or analog voice signal received from the external apparatus interface 34, and also packetizes the encoded data into an RTP packet, and inputs the RTP packet to the control unit 30 (interface 5A). The wireless communication relay unit 5, the signal processing unit 33, and the external apparatus interface 34 correspond to a "wireless communication relay unit" of the present invention.

Three external apparatus interfaces 34 (34-1 to 34-3) are provided. The three interfaces are respectively an analog interface 34-1, a digital interface 34-2, and an analog (microphone at hand/speaker) interface 34-3. In the example shown in FIG. 1, repeaters 25 and 27 are respectively connected to the analog interface 34-1 and the digital interface 34-2.

The network communication relay unit 4 relays communication between the WLAN transceivers 23, communication between the LTE transceivers 24, and communication between the WLAN transceiver 23 and the LTE transceiver 24. Moreover, in response to a call from the telephone relay unit 3, the network communication relay unit 4 relays communication between the telephone 20 or 22 (SIP phone 20, extension telephone 22) and a WLAN transceiver 23 or an LTE transceiver 24, and the communication between the telephone 20 or 22 and the radio transceiver 26 or 28.

The telephone relay unit 3, upon receiving a call from the SIP phone 20 or the extension telephone 22, determines the communication partner communication apparatus (destination apparatus), which is the call destination, and inputs the information regarding the destination apparatus and the voice signal received from the telephone 20 or 22 to the network communication relay unit 4.

FIGS. 3A and 3B are diagrams illustrating various types of tables provided in the control unit 30 for relaying a call and communication from the telephone 20 or 22 to the WLAN transceiver 23, the LTE transceiver 24, the analog radio transceiver 26, or the digital radio transceiver 28.

FIG. 3A is a diagram illustrating a call destination table 37. The call destination table 37 is for the control unit 30 to determine, when the telephone 20 or 22 made a call to the telephone relay unit 3, which of the communication apparatuses the call is made to, by referring to the call destination table 37. The communication apparatus to be called by this call is the WLAN transceiver 23, the LTE transceiver 24, the analog transceiver 26, the digital transceiver 28, or the like for which the relay device 2 performs relaying. When a user individually calls one of the communication apparatuses from the telephone 20 or 22, the user inputs, subsequent to the telephone number of the telephone relay unit 3 (relay device 2), an individual call prefix "*" and an identification number (ID) of the communication apparatus to be called. With this, the SIP telephone 20 or the VoIP gateway 21 generates a call message (INVITE message) to which "telephone number of the telephone relay unit 3"+"*"+" identification number" are added, and transmits the call message to the telephone relay unit 3.

The telephones 20 and 22 can request group calling for calling a plurality of communication apparatuses at the same time (including plenary calling) to the telephone relay unit 3. In the call destination table 37, in association with each identification number (ID), the type (individual/group/plenary) of communication designated by the identification number, the type of communication apparatus (apparatus type) and an internal address/port number that are designated by the identification number are described. With respect to each identification number of the group calling, the identification numbers of all of the communication apparatuses that belong to the group are described. When a call to which the identification number is added is made by the telephone 20 or 22, the telephone relay unit 3 searches the call destination table 37 using the identification number, and retrieves the communication apparatus that is to be a communication partner. This communication apparatus that is to be a communication partner corresponds to a destination apparatus of the present invention. The identification number corresponds to call information of the present invention.

FIG. 3B is a diagram illustrating a PTT control table 38. Transmission control modes (constant transmission mode/VOX mode/DTMF mode) associated with the respective types of the communication apparatuses are stored in the PTT control table 38. The telephone relay unit 3, when transmitting a voice signal received from the telephone 20 or 22 to the communication partner communication apparatus, determines the transmission control mode by referring to the PTT control table 38.

Figure 4:
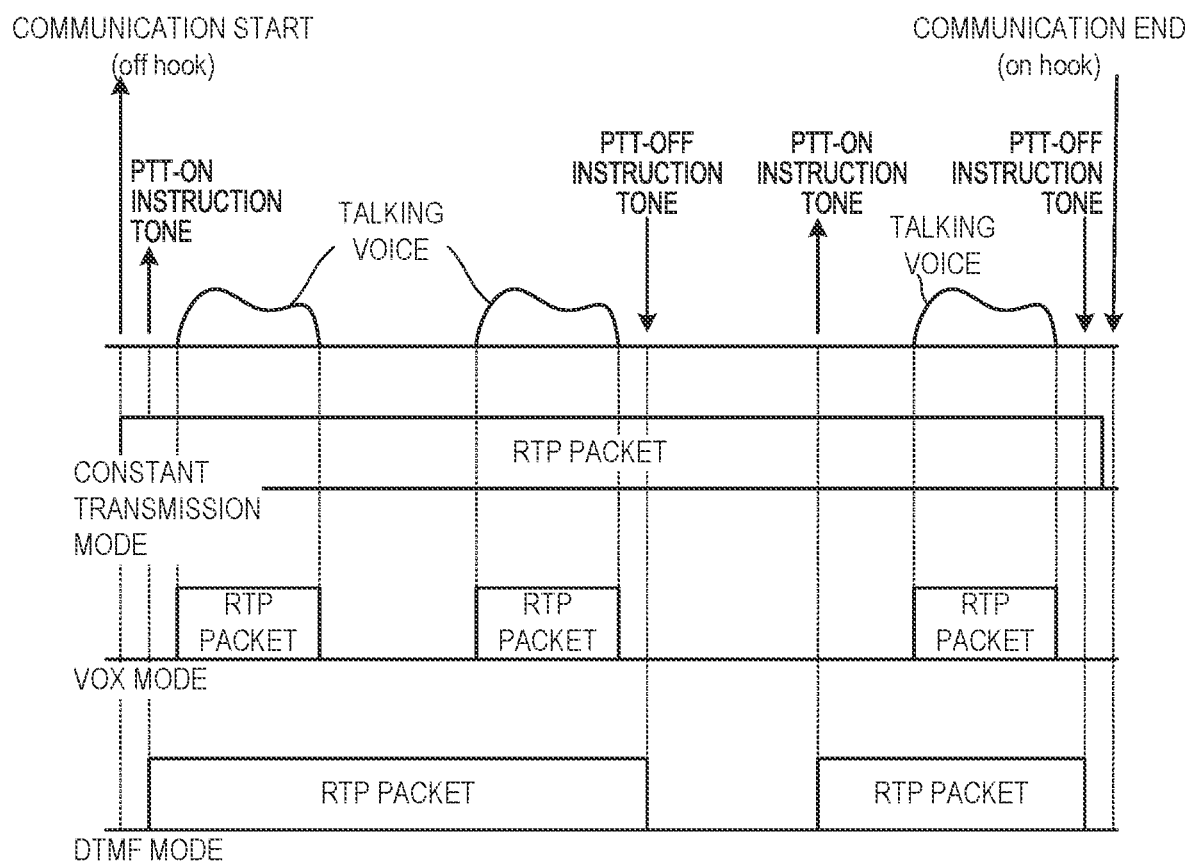
FIG. 4 is a diagram illustrating a transmission control mode of a voice signal.

A constant transmission mode, a VOX mode, and a DTMF mode will be described with reference to FIG. 4. The constant transmission mode is a mode of continuously transmitting, in a period from a communication start (off-hook) until a communication end (on-hook), the voice signal (including soundless waveform) received from the telephone 20 or 22, and is compatible with a full duplex mode, which is one of the communication modes of the transceiver. The VOX mode is a mode of transmitting, only when a voice signal whose level is a predetermined level or more (considered to be a talking voice) is input from the telephone 20 or 22, the voice signal, and is compatible with a half duplex mode, which is one of the communication modes of the transceiver. Note that, in an IP telephone system in which communication is made through the network 10, the voice signal is transmitted and received in a form of an RTP packet, in general. Also, the DTMF mode is a mode in which, after an off-hook, the transmission of a voice signal is started when a user of the telephone 20 or 22 inputs a PTT-ON instruction tone, and the transmission of the voice signal is ended when the user inputs a PTT-OFF instruction tone. This is to realize an operation analogous to the PTT (Push to Talk) switch with a telephone.

One of the constant transmission mode, the DTMF mode, and the VOX mode is designated, in the PTT control table 38, with respect to each apparatus type of the communication apparatus (destination apparatus). In the PTT control table 38, the VOX mode is designated in the case of a LAN transceiver and a radio transceiver, and the constant transmission mode is designated in the case of an LTE transceiver (telephone communication) and a microphone/speaker. Also, the DTMF mode is designated in the case of plenary communication and group communication. The transmission control mode to be designated to each apparatus type need only be a mode that matches the communication function that the communication apparatus has.

As described above, in the voice communication system of the embodiment described above, when a call designating a specific communication apparatus is made by the telephone 20 or 22 to the telephone relay unit 3, the transmission control mode of the voice signal is switched based on the type of the designated communication apparatus or whether or not the communication type is the group calling.

Figure 5:
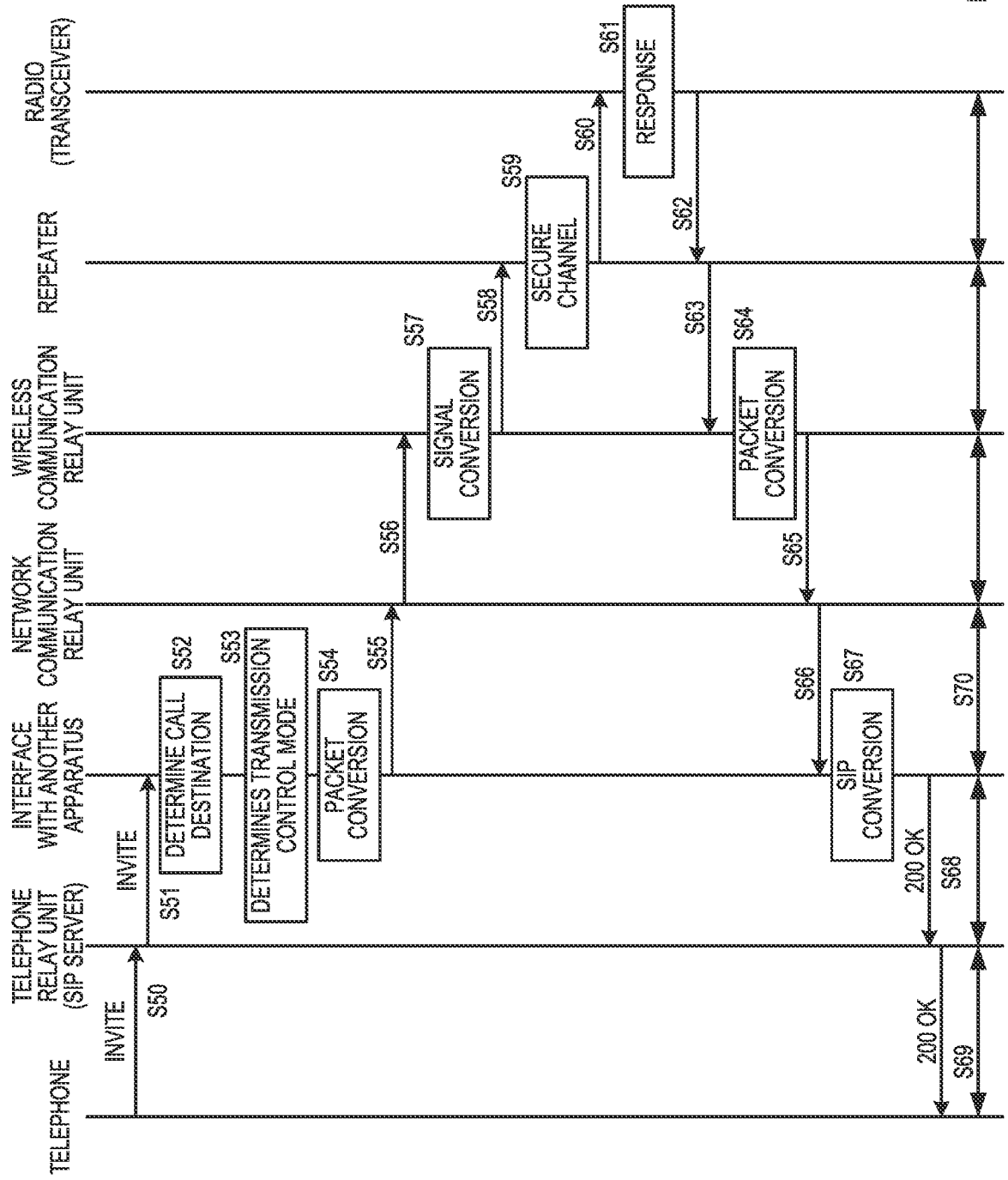
FIG. 5 is a sequence diagram when a telephone has called an analog transceiver.

The sequence from when a call was made until the start of a talk will be described with reference to FIG. 5, when the SIP telephone 20 (hereinafter, simply referred to as the telephone 20), out of the telephones 20 and 22, has called the analog radio transceiver 26 (hereinafter, simply referred to as the radio transceiver 26). The calling sequence from the telephone to the interface 3A is in conformity with SIP, and detailed responses such as "100 Trying" and "180 Ringing" in the middle of calling are not displayed.

When the telephone 20 has transmitted an INVITE message to the telephone relay unit 3 (step S50), the telephone relay unit 3 transfers this INVITE message to the interface 3A in order to call the destination apparatus (radio transceiver 26, in this example) (step S51). In the interface 3A, which of the communication apparatuses the call is made to is determined by searching the call destination table 37 by using the identification number added to the INVITE message (step S52). At the same time, the telephone relay unit 3 (interface 3A) searches the PTT control table 38 by using the apparatus type read out from the call destination table 37 (analog transceiver, in this example), and determines that the transmission control mode is the VOX mode (step S53). The telephone relay unit 3 generates a call packet in an RTP packet format for calling the determined communication apparatus (radio transceiver 26) (step S54), and outputs the call packet to the network communication relay unit 4 (step S55). This call packet is addressed to the address and port number that are described in the call destination table 37.

The call packet is transferred from the network communication relay unit 4 to the wireless communication relay unit 5 based on the destination address and the like (step S56). In the wireless communication relay unit 5, this call packet is converted to a call signal for calling the radio transceiver 26 (step S57), and this call signal is input to the repeater 25 (step S58). At the same time, the wireless communication relay unit 5 (external apparatus interface 34) outputs a PTT signal to the repeater 25. The repeater 25, upon receiving the call signal and the PTT signal, secures a channel that is a frequency band for wireless communication (step S59), and calls the radio transceiver 26 using the channel (step S60).

The radio transceiver 26 that has received the call signal generates a call tone. When a user has responded to this call tone (step S61), a response signal is transmitted from the radio transceiver 26 to the repeater 25 (step S62). The repeater 25 inputs this response signal to the wireless communication relay unit 5 (step S63). The wireless communication relay unit 5 converts the response signal to a response packet (RTP packet) that is addressed to the interface 3A of the telephone relay unit 3 (step S64), and transmits the response packet to the network communication relay unit 4 (step S65). The network communication relay unit 4 transfers this RTP packet to the interface 3A according to the destination address (step S66). The interface 3A, upon receiving this RTP packet, which is a reply, converts the RTP packet to an SIP message (200 OK) of response (step S67), and transmits the SIP message to the telephone 20 via the telephone relay unit 3, as a reply (steps S68 and S69). With this, the telephone 20 enters a talking state from a calling state, and the communication between the telephone 20 and the radio transceiver 26 is started (step S70).

When the communication is started, voice signals (RTP packets) are constantly and continuously input from the telephone 20 to the telephone relay unit 3. Only when a voice signal whose level is a predetermined level or more is input, this voice signal is re-edited to an RTP packet, and the RTP packet is transmitted to the network communication relay unit 4. Here, the RTP packet to be re-edited is a packet in a format for transferring a voice signal inside the relay device 2, and this format is different from the format used by the IP telephone.

Figure 6:
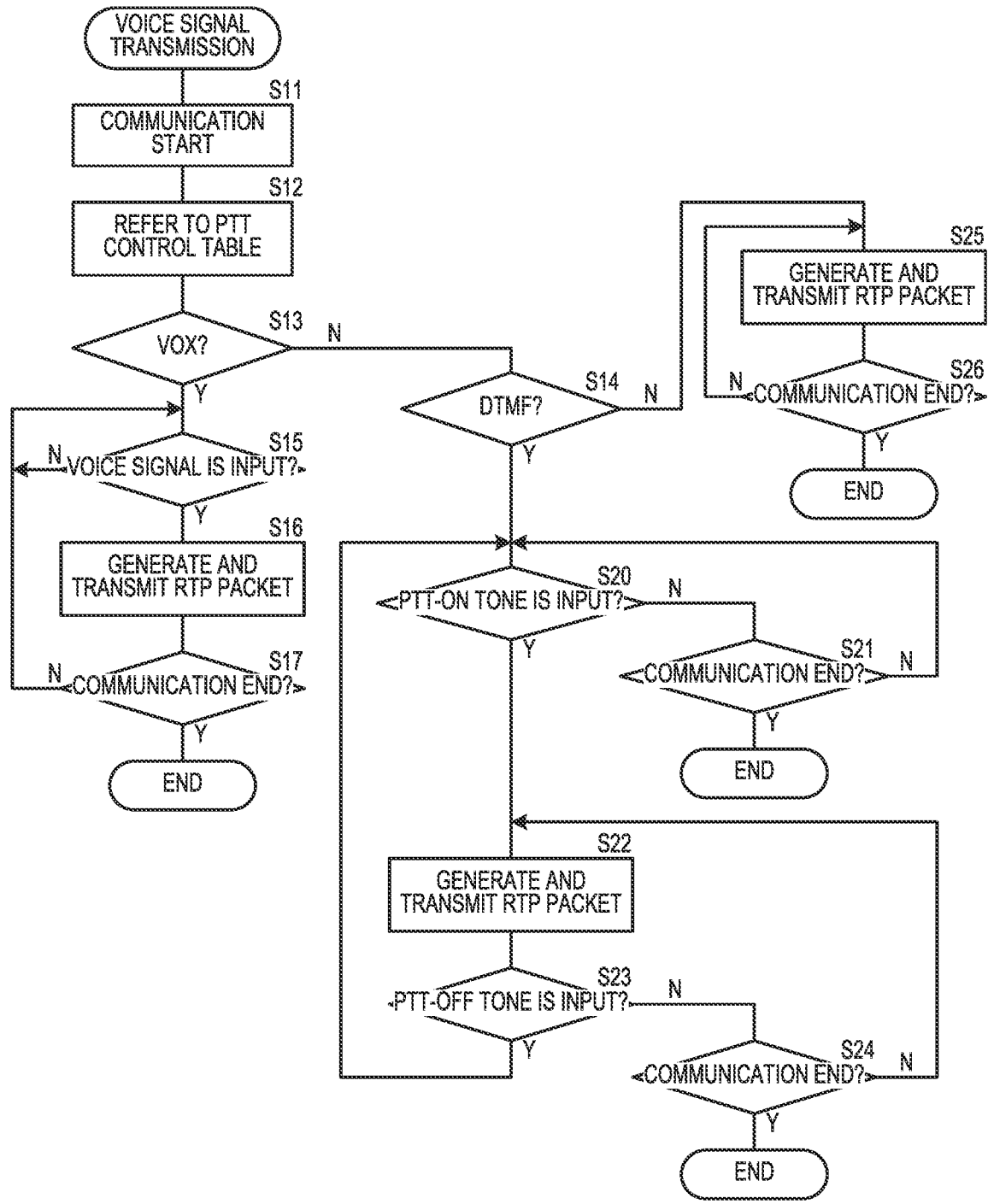
FIG. 6 is a flowchart of a telephone relay unit of the relay device.

FIG. 6 is a flowchart indicating voice signal transmission control processing of the control unit 30 (telephone relay unit 3, interface 3A). This processing indicates processing that is performed when the voice signal received from the telephone 20 or 22 is transmitted to a communication apparatus that is the communication partner. When the communication between the telephone and the communication apparatus is started (step S11), the control unit 30 refers to the PTT control table 38 (step S12). Here, the PTT control table 38 is searched by using the apparatus type obtained by searching the call destination table 37 by using the identification number added to the INVITE message. The voice signal is transmitted using the retrieved control mode.

If the determined control mode is the VOX mode (YES in step S13), the processing of steps S15 to S17 is executed. If the determined control mode is the DTMF mode (NO in step S13, YES in step S14), the processing of steps S20 to S24 is executed. If the determined control mode is the constant transmission mode (NO in step S13, NO in step S14), the processing of steps S25 and S26 is executed.

In the case of the VOX mode (YES in step S13), the control unit 30 determines whether or not a voice signal whose level is the predetermined level or more is input (step S15), and only when a voice signal whose level is the predetermined level or more is input (YES in step S15), generates an RTP packet of the voice signal, and transmits the RTP packet (step S16). The processing described above is successively performed until the communication is ended (YES in step S17).

In the case of DTMF mode (NO in step S13, YES in step S14), the control unit 30 determines whether or not a PTT-ON instruction tone is input (step S20), and whether or not a PTT-OFF instruction tone is input (step S23), and generates and transmits RTP packets of the voice signal (step S22), in a period from when the PTT-ON instruction tone was input (YES in step S20) until when the PTT-OFF instruction tone is input (YES in step S23). Note that, if the communication is ended (YES in step S21 or S24) when monitoring the input of the PTT-ON instruction tone (step S20) and the input of the PTT-OFF instruction tone (step S23), the control unit 30 ends the processing.

In the case of the constant transmission mode (NO in steps S13 and S14), the control unit 30 continues to generate and transmit RTP packets of the voice signal (step S25) until the communication is ended (YES in step S26). Note that, in any of the transmission control modes, a voice RTP packet is generated and transmitted every fixed time period (every 20 ms, for example).

The wireless communication relay unit 5, upon receiving a voice signal from the telephone relay unit 3 (via the network communication relay unit 4), performs control such that this voice signal is input to an apparatus (repeater or the like) that is connected to the external apparatus interface 34, and the voice signal is to be output. That is, when a repeater is connected, the wireless communication relay unit 5 instructs the repeater to transmit the voice signal by inputting a PTT signal. In the case of the microphone/speaker 29, the voice signal is output from the speaker as a sound without specific operation.

In the embodiment described above, the processing that is performed when the telephone 20 or 22 has called the radio transceiver 26 or 28 or the like has been described. When the reverse operation is to be performed, that is, when the radio transceiver 26 or 28 calls the telephone 20 or 22 as well, the transmission control mode of the voice signal may be determined by searching the call destination table 37 and the PTT control table 38 based on the ID of the radio transceiver. In this case, the call destination table 37 is used as a table for determining the apparatus type of a communication apparatus that is the transmission source. In this case, when an INVITE message is transmitted to the telephone 20 or 22, because the apparatus that has made the call has been determined, the transmission control mode of the voice signal has also been determined, and therefore, when the telephone 20 or 22 responds, the voice signal from the telephone 20 or 22 need only be transmitted to the radio transceiver that has made the call using this determined transmission control mode.

REFERENCE NUMERALS

1 Voice communication system
2 Relay device
3 Telephone relay unit
3A Interface
4 Network communication relay unit
5 Wireless communication relay unit
20 SIP telephone
22 Extension telephone
25 Analog radio (repeater)
26 Analog transceiver
27 Digital radio (repeater)
28 Digital transceiver
29 Microphone/speaker
34-1 to 3 External apparatus interface

What is claimed is:
1. A relay device that includes a telephone relay unit and a wireless communication relay unit,
wherein the telephone relay unit receives call information from a telephone via a network, and after a communi- cation partner designated by the call information has responded, transmits/receives a voice signal to/from the telephone, the wireless communication relay unit, to which a repeater that is a relaying radio is connected, transmits/receives a voice signal to/from a radio via the repeater, moreover the telephone relay unit determines at least one destination apparatus that is a radio to be called based on the call information received from the telephone, and transfers a voice signal received from the telephone to the wireless communication relay unit, the wireless communication relay unit transfers a voice signal transferred from the telephone relay unit to the destination apparatus that is the communication partner, and the telephone relay unit includes a call destination table in which a record including the call information, an address of the destination apparatus, and an apparatus type of the destination apparatus is stored for each of the radios, and a transfer control table in which a record including the apparatus type and the transfer control mode of a voice signal is stored for each of the apparatus types, and the telephone relay unit determines the apparatus type of the destination apparatus by referring to the call destination table, determines the transfer control mode of a voice signal corresponding to the determined apparatus type by referring to the transfer control table, and transfers the voice signal to the wireless communication relay unit using the determined transfer control mode, and the transfer control mode of a voice signal is one of a constant transmission mode in which voice signals are transferred without interruption in a period in which the telephone and the destination apparatus perform communication, a VOX mode in which only when a voice signal whose level is a predetermined level or more is input from a telephone, the voice signal is transferred, and a DTMF mode in which voice signals are transferred without interruption in a period after a tone signal instructing a transmission start was input until a tone signal instructing a transmission stop is input.

2. The relay device according to claim 1, wherein the transfer control table stores a transfer control mode of a voice signal in accordance with a function of transmitting and receiving a voice signal that the destination apparatus has, in association with the apparatus type.

3. The relay device according to claim 1, further comprising:

a network communication relay unit that is to be connected to a WLAN transceiver that starts transmitting a voice signal to the communication partner without performing a prior call procedure, via the network, and is to be connected to an LTE transceiver that starts transmitting a voice signal to the communication partner without performing a prior call procedure, via an LTE network that is a communication network of a mobile telephone, wherein the call destination table and the transfer control table store, the WLAN transceiver and the LTE transceiver being destination apparatuses, the call information, addresses of the destination apparatuses, the apparatus types, and the transfer control modes of a voice signal.

4. The relay device according to claim 1, wherein the call destination table further stores a record of group communication in which a plurality of communication apparatuses are destination apparatuses.

5. The relay device according to claim 1, wherein the transfer control table stores a transfer control mode of a voice signal in accordance with a function of transmitting and receiving a voice signal that the destination apparatus has, in association with the apparatus type.

6. The relay device according to claim 1, further comprising:

a network communication relay unit that is to be connected to a WLAN transceiver that starts transmitting a voice signal to the communication partner without performing a prior call procedure, via the network, and is to be connected to an LTE transceiver that starts transmitting a voice signal to the communication partner without performing a prior call procedure, via an LTE network that is a communication network of a mobile telephone, wherein the call destination table and the transfer control table store, the WLAN transceiver and the LTE transceiver being destination apparatuses, the call information, addresses of the destination apparatuses, the apparatus types, and the transfer control modes of a voice signal.

7. The relay device according to claim 2, further comprising:

a network communication relay unit that is to be connected to a WLAN transceiver that starts transmitting a voice signal to the communication partner without performing a prior call procedure, via the network, and is to be connected to an LTE transceiver that starts transmitting a voice signal to the communication partner without performing a prior call procedure, via an LTE network that is a communication network of a mobile telephone, wherein the call destination table and the transfer control table store, the WLAN transceiver and the LTE transceiver being destination apparatuses, the call information, addresses of the destination apparatuses, the apparatus types, and the transfer control modes of a voice signal.

8. A relay method of a voice signal, in a relay device to which a telephone and a repeater that is a relaying radio that communicates with a radio are connected, the relay method comprising:

receiving call information for calling a radio from the telephone via a network;

determining at least one destination apparatus that is a radio to be called based on the call information received from the telephone;

transferring, by the wireless communication relay unit, a voice signal transferred from the telephone relay unit to the destination apparatus that is the communication partner, and determining a transfer control mode of a voice signal corresponding to the determined destination apparatus;

calling the destination apparatus via the repeater;

transferring, after the destination apparatus has responded, a voice signal received from the telephone to the destination apparatus via the repeater using the determined transfer control mode;

determining an apparatus type of the destination apparatus by referring to a call destination table in which a record including the call information, an address of the destination apparatus, and an apparatus type of the destination apparatus is stored for each of the radios; and determining a transfer control mode of a voice signal corresponding to the determined apparatus type by referring to a transfer control table in which a record including the apparatus type and the transfer control mode of a voice signal is stored for each of the apparatus types; and transferring the voice signal to the wireless communication relay unit using the determined transfer control mode, wherein the transfer control mode of a voice signal is one of a constant transmission mode in which voice signals are transferred without interruption in a period in which the telephone and the destination apparatus perform communication, a VOX mode in which only when a voice signal whose level is a predetermined level or more is input from the telephone, the voice signal is transferred, and a DTMF mode in which voice signals are transferred without interruption in a period after a tone signal instructing a transmission start was input until a tone signal instructing a transmission stop is input.

9. The relay method of a voice signal according to claim 7, wherein the transfer control table stores a transfer control mode of a voice signal in accordance with a function of transmitting and receiving a voice signal that the destination apparatus has, in association with the apparatus type.

10. The relay method of a voice signal according to claim 7, wherein the relay device is further connected to a WLAN transceiver that starts transmitting a voice signal to a communication partner without performing a prior call procedure and an LTE transceiver that starts transmitting a voice signal to a communication partner without performing a prior call procedure, and the call destination table and the transfer control table store, the WLAN transceiver and the LTE transceiver being destination apparatuses, the call information, addresses of the destination apparatuses, the apparatus types, and the transfer control modes of a voice signal.

11. The relay method of a voice signal according to claim 7, wherein the call destination table further stores a record of group communication in which a plurality of communication apparatuses are destination apparatuses.

12. The relay method of a voice signal according to claim 8, wherein the transfer control table stores a transfer control mode of a voice signal in accordance with a function of transmitting and receiving a voice signal that the destination apparatus has, in association with the apparatus type.

13. The relay method of a voice signal according to claim 8, wherein the relay device is further connected to a WLAN transceiver that starts transmitting a voice signal to a communication partner without performing a prior call procedure and an LTE transceiver that starts transmitting a voice signal to a communication partner without performing a prior call procedure, and the call destination table and the transfer control table store, the WLAN transceiver and the LTE transceiver being destination apparatuses, the call information, addresses of the destination apparatuses, the apparatus types, and the transfer control modes of a voice signal.

* * * * *